Patented June 19, 1928.

1,673,807

UNITED STATES PATENT OFFICE.

ELMER ANSON DANIELS, OF BERWYN, AND HARRY STIRLING SNELL, OF CHICAGO, ILLINOIS, ASSIGNORS TO WESTERN ELECTRIC COMPANY, INCORPORATED, OF NEW YORK, N. Y., A CORPORATION OF NEW YORK.

HARDENING OF RESINOUS EXUDATIONS BY THE USE OF A HETEROCYCLIC COMPOUND.

No Drawing. Application filed August 21, 1924. Serial No. 733,446.

This invention relates to improved compositions of matter and methods of producing the same.

Objects of the invention are to produce an improved composition of matter having a resinous exudation as its base and to provide a method for producing the improved composition.

According to the main features of the invention a resinous exudation, preferably shellac, is treated with a condensing agent in such a manner as to produce a new condensation product; prior to the condensing action fillers may be incorporated with the resinous exudation and improved molding compositions produced thereby.

Although other organic compounds may be employed, it has been discovered by us that good results are obtainable by using any of the heterocyclic compounds containing a basic nitrogen group as a component part of the ring. Examples of this class of compounds which have been used with good results are the piperidine-carbon disulphide addition products and pyridine. Although satisfactory results are obtainable with all of these compounds the first mentioned compound, piperidine-carbon disulphide addition product, seems to give the greatest hardening effect. By piperidine-carbon disulphide addition product is meant the piperidine salt of pentamethylenedithiocarbamic acid

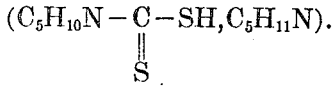

Various methods may be employed for treating the shellac with the hardening agent. Any chemical or mechanical method by means of which condensation or combination of the two materials can be effected, may be employed. The preferred method, however, is to dissolve the shellac in a suitable solvent, for example, alcohol, and add the hardener alone or dissolved in a solvent in greater or lesser amounts depending upon the hardness desired, and then removing the alcohol by evaporation. When this form of treatment is employed a very intimate intermingling is obtained. After the shellac and hardener have been brought together they may be heated to cause a reaction between the two substances to produce a condensation product. The temperature may be varied, but when a low temperature is employed it must be continued for a greater length of time than if a higher temperature is used. The reaction may be hastened by employing pressure with the heating, and where the material is to be molded the pressure can serve the double purpose of hastening the reaction and at the same time forming the article to be produced.

This material has its greatest use in the production of molding compounds. Various fillers such as infusorial earth, wood flour, asbestos fibre, and the like, may be incorporated with the alcoholic solution of shellac, the alcohol removed by evaporation and the residual material then molded by means of heat and pressure into the article desired. A suitable mixture comprising wood flour as a filler which when completed can be employed as a substitute for wood or other materials may have the following proportions: shellac, 50 pounds; denatured alcohol, 15 gallons; piperidine-carbon disulphide addition product, 0.5 pounds; and wood flour, 300 pounds. After mixing, the ingredients are agitated until they are thoroughly intermingled. All of the alcohol is then removed by evaporation and the remaining material in the form of a dry powder can then be molded by heat and pressure into whatever shape is desired.

The molding operation can be carried on in a number of ways. A specific process which gives uniformly good results consists in placing the powder in a suitable mold and subjecting it to a 2,000 pound pressure per square inch for 10 or 15 minutes, during which time a temperature from 260° F. to 270° F. is maintained. The pressure serves the purpose of compressing the materials and at the same time hastening the condensing action. After the material has been subjected to head and pressure for a sufficient time to complete the chemical reaction, the source of heat is removed and the composition allowed to cool while still under pressure.

The article produced in this manner is resistant to alcohol and will soften only very slightly below a temperature of 250° F. Although specific amounts of the ingredients and definite steps in the molding operation are disclosed above, the amounts of the ingredients and the method employed in treating them may be varied over a wide range depending upon the type of final product desired.

A hardened shellac produced in the manner described herein can be used advantageously as the binder for an improved cork composition, such as that described in our copending application, Serial No. 724,950, filed July 9, 1924.

What is claimed is:

1. A composition of matter formed by the condensation of a resinous exudation and piperidine-carbon disulphide addition product.

2. A composition of matter formed by the condensation of shellac and piperidine-carbon disulphide addition product.

3. A method of hardening a resinous exudation, which consists in adding piperidine-carbon disulphide addition product thereto, and heating.

4. A method of hardening a resinous exudation, which consists in adding piperidine-carbon disulphide addition product thereto, and then subjecting the resulting mixture to heat and pressure.

5. A method of hardening shellac, which consists in adding piperidine-carbon disulphide addition product thereto, and heating.

6. A method of hardening shellac, which consists in adding piperidine-carbon disulphide addition product thereto, and then subjecting the resulting mixture to heat and pressure.

7. A composition of matter formed by the condensation of a resinous exudation, and a compound which is a member of the group including pyridine, its derivative, substitution and addition products.

8. A method of hardening a resinous exudation, which consists in adding thereto a compound which is a member of the group including pyridine, its derivative, substitution and addition products, and heating.

9. A method of hardening a resinous exudation, which consists in adding thereto a compound which is a member of the group including pyridine, its derivative, substitution and addition products, and then subjecting the resulting mixture to heat and pressure.

In witness whereof, we hereunto subscribe our names this 16 day of August, A. D., 1924.

ELMER ANSON DANIELS.
HARRY STIRLING SNELL.